United States Patent
Kim et al.

(10) Patent No.: US 8,102,927 B2
(45) Date of Patent: Jan. 24, 2012

(54) METHOD AND APPARATUS FOR GENERATING AND RECEIVING OFDM SYMBOL

(75) Inventors: Nam-Il Kim, Daejeon (KR); Il-Gyu Kim, Seoul (KR); Hye-Kyung Jwa, Daejeon (KR); Young-Hoon Kim, Daejeon (KR); Seung-Chan Bang, Daejeon (KR)

(73) Assignees: SK Telecom. Co., Ltd., Seoul (KR); KT Corporation, Seongnam (KR); Electronics & Telecommunications Research Institute, Daejeon (KR)

( * ) Notice: Subject to any disclaimer, the term of this patent is extended or adjusted under 35 U.S.C. 154(b) by 759 days.

(21) Appl. No.: 12/160,555

(22) PCT Filed: Jan. 12, 2007

(86) PCT No.: PCT/KR2007/000218
§ 371 (c)(1),
(2), (4) Date: Jul. 10, 2008

(87) PCT Pub. No.: WO2007/081173
PCT Pub. Date: Jul. 19, 2007

(65) Prior Publication Data
US 2009/0003478 A1    Jan. 1, 2009

(30) Foreign Application Priority Data
Jan. 13, 2006  (KR) .................. 10-2006-0003786
Nov. 20, 2006  (KR) .................. 10-2006-0114617

(51) Int. Cl.
*H04K 1/10*     (2006.01)
*H04L 5/12*     (2006.01)

(52) U.S. Cl. ........................................ 375/260; 375/261
(58) Field of Classification Search ............... 375/260, 375/267, 261
See application file for complete search history.

(56) References Cited

U.S. PATENT DOCUMENTS

| 2004/0008616 | A1 | 1/2004 | Jung et al. |
| 2004/0136314 | A1 | 7/2004 | Jung et al. |
| 2004/0160893 | A1* | 8/2004 | Park et al. ............ 370/206 |

(Continued)

FOREIGN PATENT DOCUMENTS

GB      2 412 826      10/2005

(Continued)

OTHER PUBLICATIONS

A.E. Jones et al., Block Coding Scheme For Reduction Of Peak To Mean Envelope Power Ratio Of Multicarrier Transmission Schemes, Dec. 8, 1994, pp. 2098-2099, vol. 30, No. 25.

(Continued)

*Primary Examiner* — Don N Vo
(74) *Attorney, Agent, or Firm* — Kile Park Goekjian Reed & McManus PLLC

(57) ABSTRACT

The present invention provides an OFDM symbol generating apparatus. The OFDM symbol generating apparatus generates a plurality of weight-applied symbol groups by applying a plurality of weights to a digital modulation symbol group, and generates a plurality of IFFT symbol groups by performing an IFFT operation on the plurality of weight-applied symbol groups. Subsequently, an IFFT symbol group having the minimum PAPR is selected from among the plurality of IFFT symbol groups such that a characteristic of a PAPR can be improved without reducing data transmission speed.

24 Claims, 8 Drawing Sheets

U.S. PATENT DOCUMENTS

2005/0270968 A1   12/2005  Feng et al.
2006/0104373 A1*  5/2006  Bar-Ness et al. ............. 375/260
2008/0101487 A1*  5/2008  Muck et al. .................. 375/260

FOREIGN PATENT DOCUMENTS

| | | |
|---|---|---|
| KR | 10-2004-0005175 | 1/2004 |
| WO | 2005/025102 | 3/2005 |

OTHER PUBLICATIONS

K. Sathananthan et al., Adaptive Transform Scheme To Reduce Par Of An OFDM Signal, 2004, pp. 1722-1723.
Search Report-PCT/KR2007/000218 dated Jul. 30, 2008.
Written Opinion-PCT/KR2007/000218 dated Jul. 30, 2008.

* cited by examiner

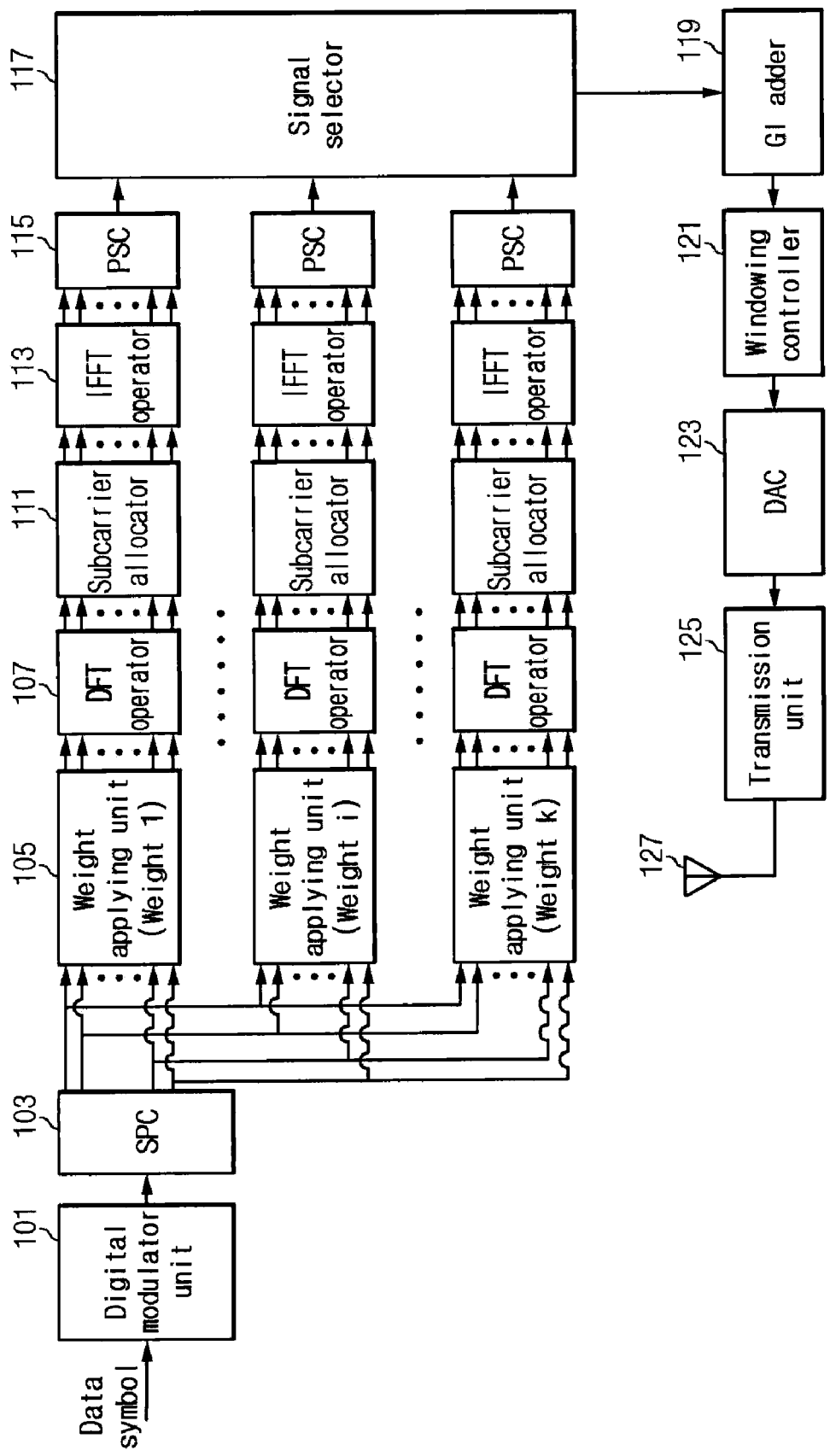
[Figure 2]

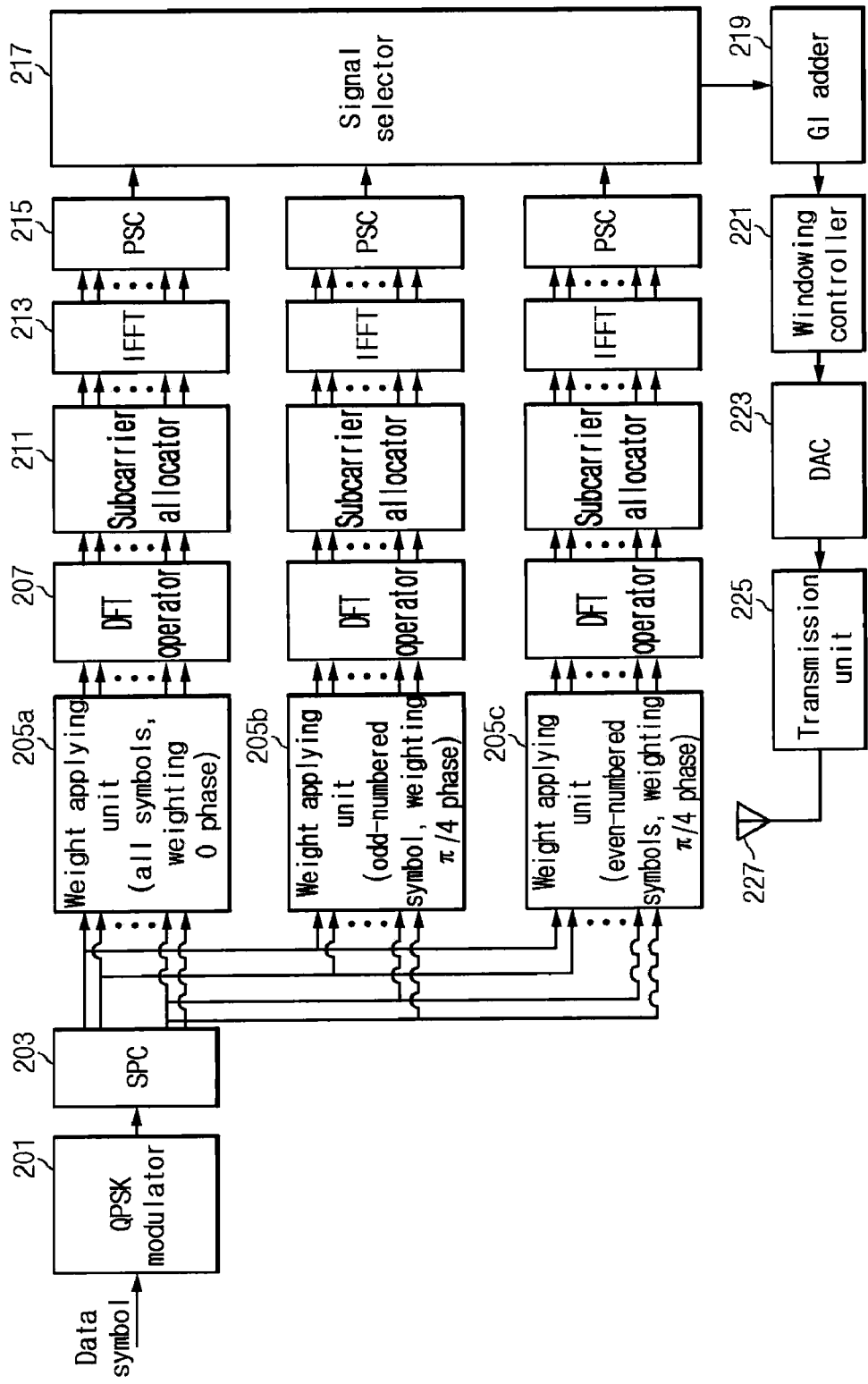
[Figure 3]

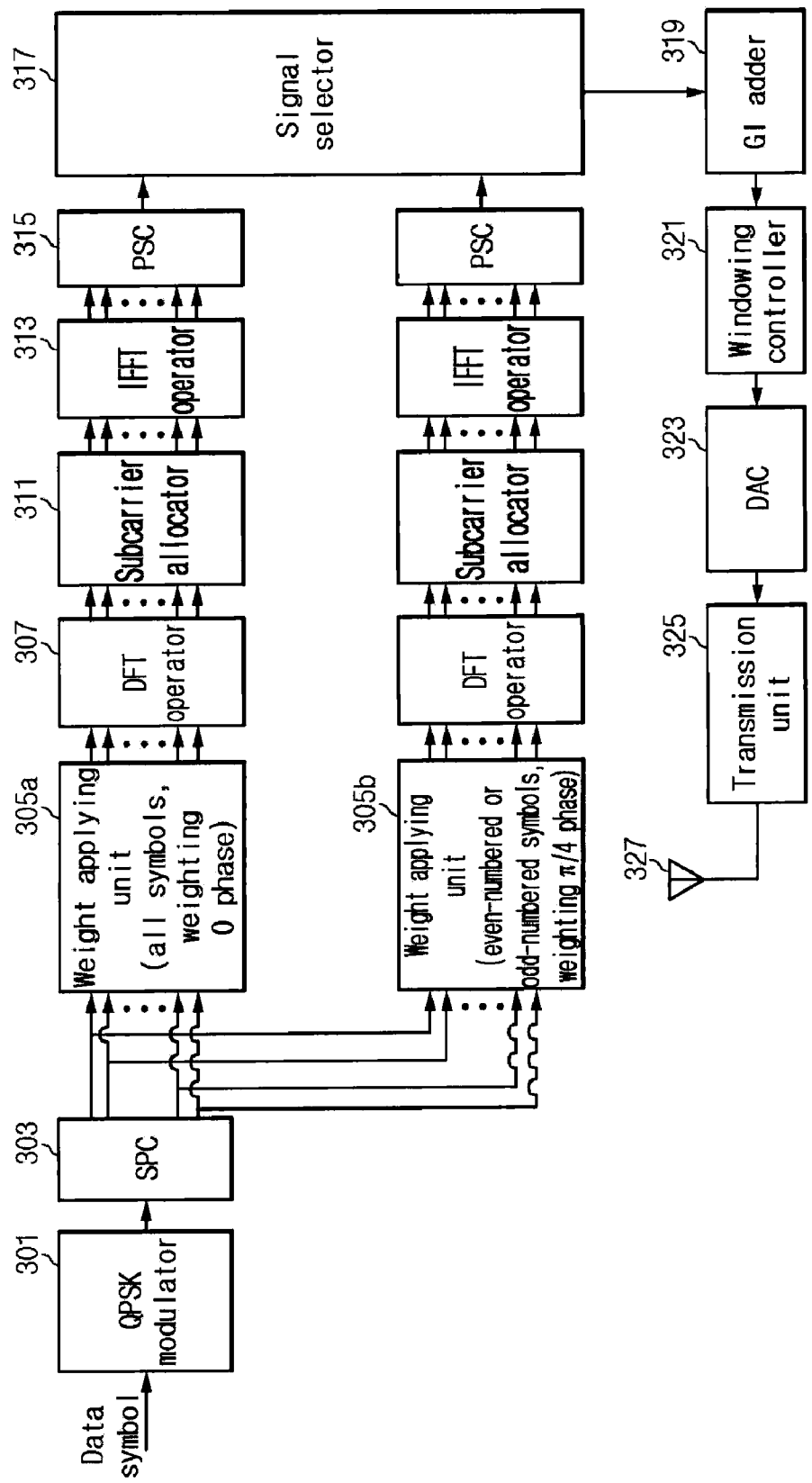
[Figure 4]

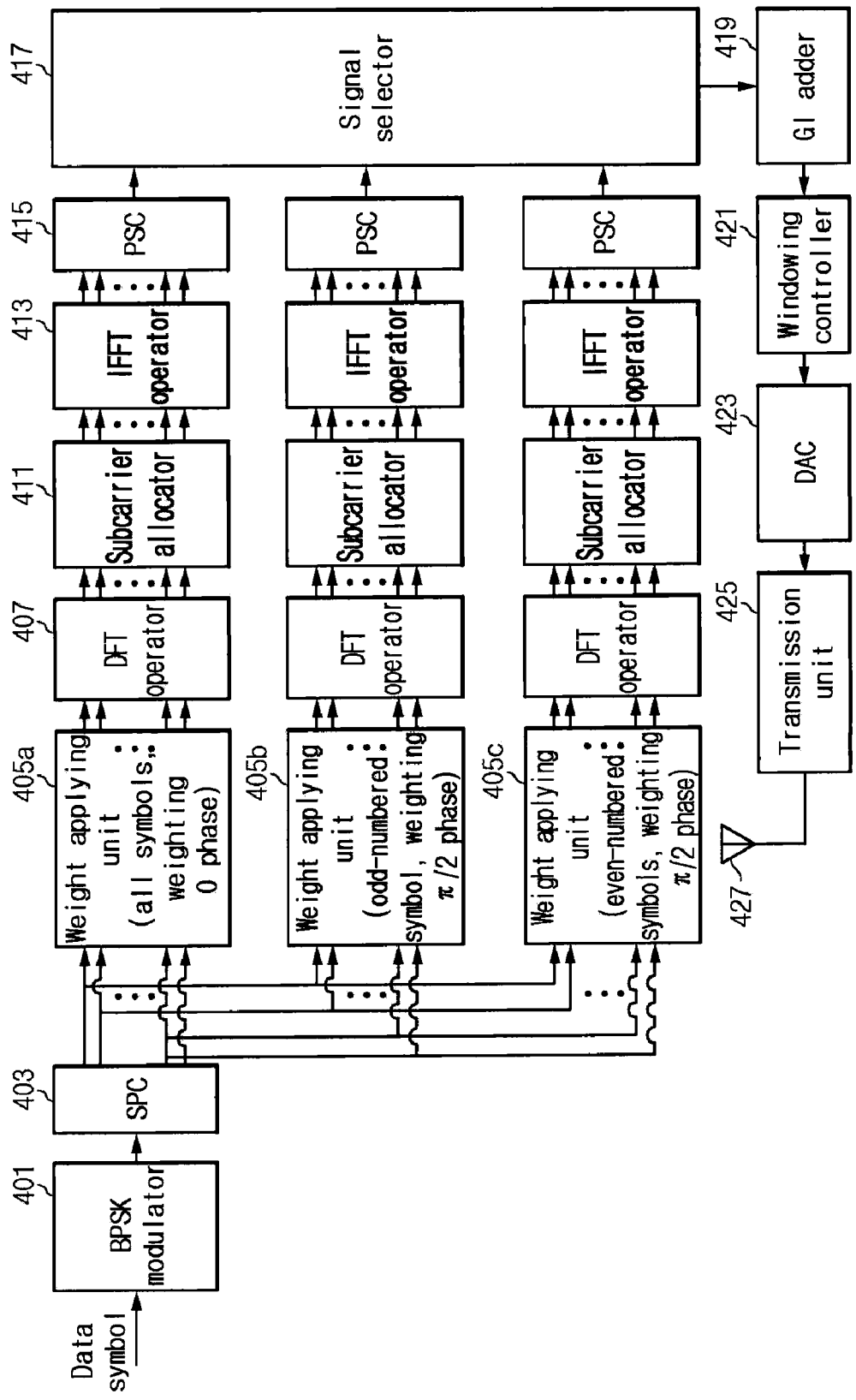
[Figure 5]

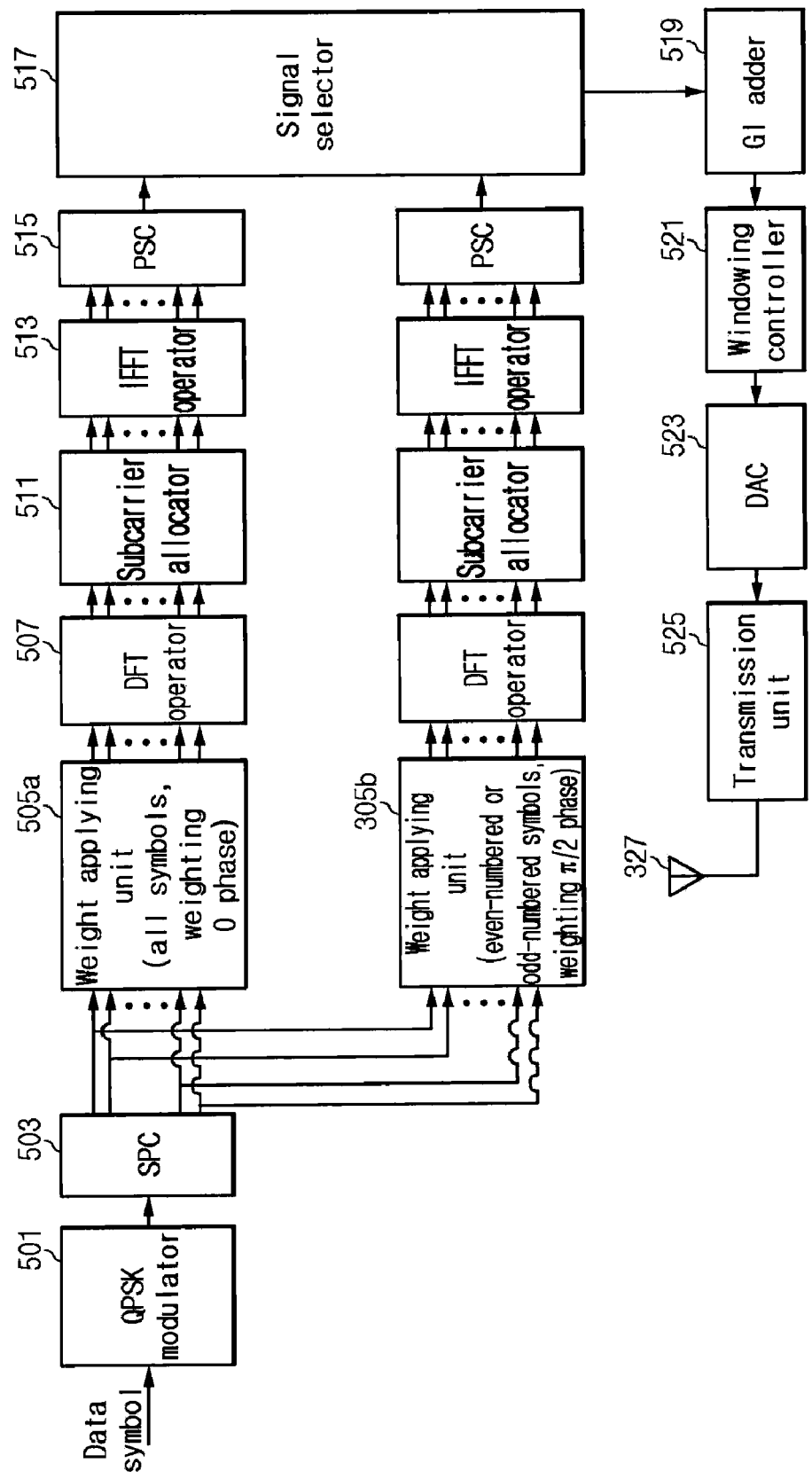
[Figure 6]

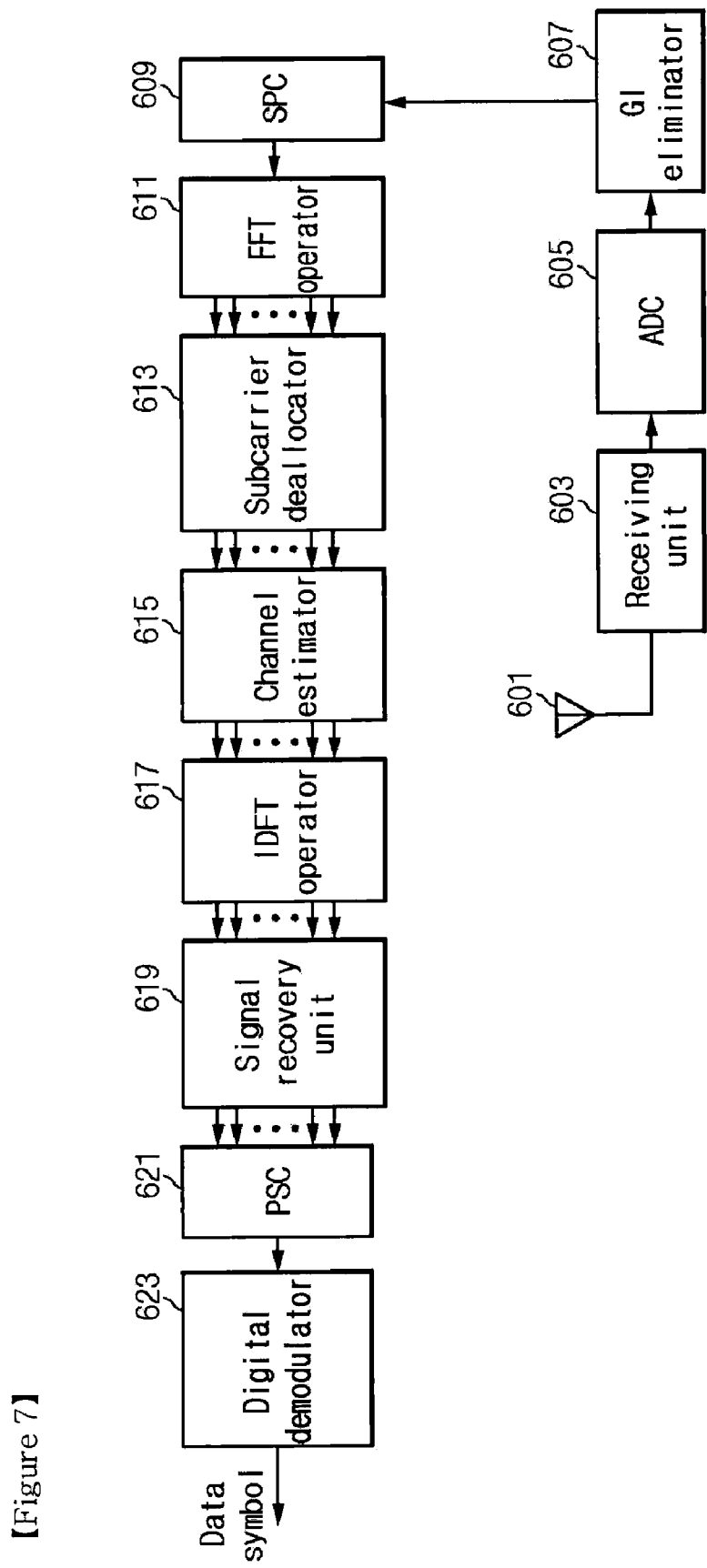
[Figure 7]

[Figure 8]
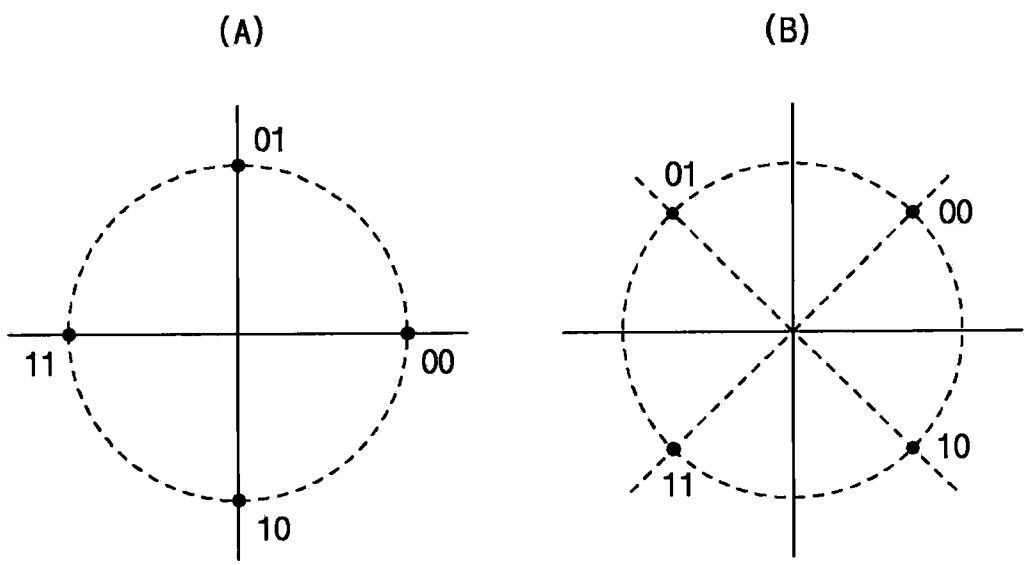
[Figure 9]
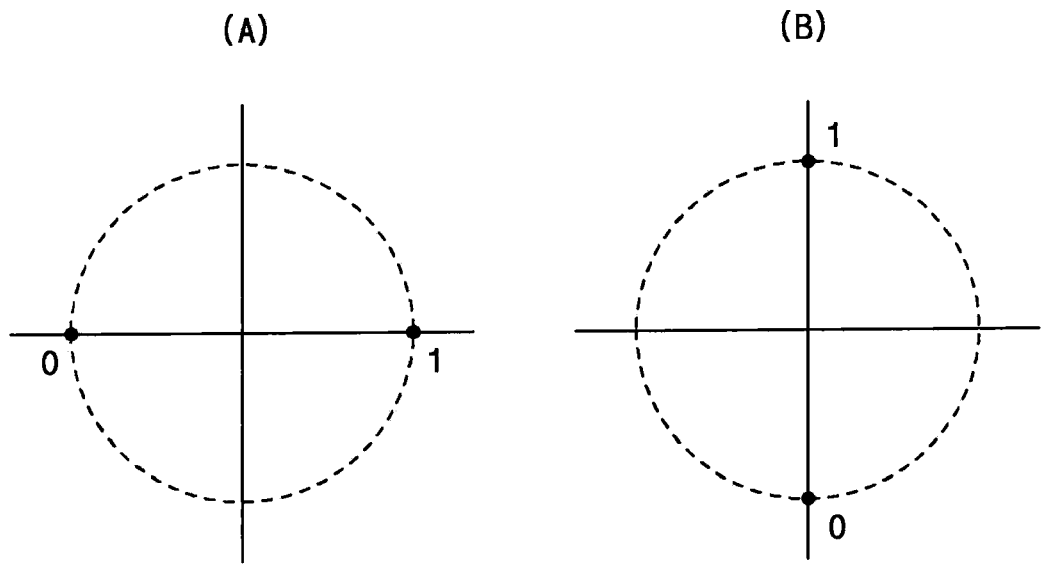

METHOD AND APPARATUS FOR GENERATING AND RECEIVING OFDM SYMBOL

TECHNICAL FIELD

The present invention relates to an orthogonal frequency division multiplexing (OFDM) symbol generating apparatus, an OFDM symbol transmitting apparatus, and an OFDM symbol receiving apparatus. Particularly, the present invention relates to peak-to-average power ratio (PAPR) reduction in OFDM symbol transmission/receiving.

BACKGROUND ART

A conventional orthogonal frequency division multiplexing (OFDM)-based signal transmitting apparatus and a conventional OFDM signal receiving apparatus will be described with reference to FIG. 1.

FIG. 1 is a block diagram of a conventional OFDM-based signal transmitting apparatus 10 and a conventional OFDM-based signal receiving apparatus 20.

As shown in FIG. 1, the conventional OFDM-based signal transmitting apparatus 10 includes a digital modulator 11, a serial-to-parallel converter (SPC) 12, an inverse fast Fourier transform (IFFT) operator 13, a parallel-to-serial converter (PSC) 14, a cyclic prefix (CP) adder 15, a digital-to-analog converter (DAC) 16, a transmission unit 17, and a transmit antenna 18.

The digital modulator 11 digital-modulates a data symbol to be transmitted through a channel and generates a digital modulation symbol, the data symbol formed of binary data. The digital modulation performed by the digital modulator 11 includes binary phase shift keying (BPSK) modulation, quadrature phase shift keying (QPSK) modulation, quadrature amplitude modulation (QAM), 16-QAM, and 64-QAM. The digital modulator 11 is also referred to as a symbol mapping unit.

The SPC 12 serially receives a plurality of digital modulation symbols from the digital modulator 11 and outputs the received digital modulation symbols in parallel.

The IFFT operator 13 performs an IFFT operation on the parallel digital modulation symbols output from the SPC 12 and generates a plurality of IFFT symbols.

The PSC 14 receives the plurality of IFFT symbols output from the IFFT operator 13 in parallel, and serially outputs the IFFT symbols.

The CP adder 15 adds a CP signal in front of each of the IFFT symbols serially output from the PSC 14 and generates a symbol group to which the CP is added. Herein, the CP signal is a copy of a last portion of each of the plurality of IFFT symbols.

The DAC 16 receives the symbol group to which the CP is added from the CP adder 15, converts the symbol group into an analog signal, and generates one OFDM symbol.

The transmission unit 17 amplifies the OFDM symbol generated by the DAC 16 into a radio frequency (RF) signal and transmits the RF signal to a channel through the transmit antenna 18.

As shown in FIG. 1, the conventional OFDM-based signal receiving apparatus 20 includes a receive antenna 21, a receiving unit 22, an analog-to-digital converter (ADC) 23, a CP eliminator 24, an SPC 25, a fast Fourier transform (FFT) operator 26, a PSC 27, and a digital demodulator 28.

The receiving unit 22 receives an OFDM symbol from the channel through the receive antenna 21.

The ADC 23 converts the OFDM symbol received by the receiving unit 22 into a digital signal and generates a plurality of digital symbols.

The CP eliminator 24 eliminates a CP signal from each of the digital symbols generated by the ADC 23.

The SPC 25 serially receives the digital symbols from which the CP is eliminated and outputs the CP-eliminated digital symbols in parallel.

The FFT operator 26 receives the digital symbols output in parallel from the SPC 25, performs an FFT operation, and generates a plurality of frequency domain symbols.

The PSC 27 receives the frequency domain symbols in parallel and serially outputs them.

The digital demodulator 28 digitally demodulates the plurality of frequency domain symbols that have been serially output from the PSC 27 and generates a data symbol.

The OFDM symbol generated through the above-described method has a drawback of having a high peak to average power ratio (PAPR). An OFDM symbol with a high PAPR may experience signal distortion when the OFDM symbol is being amplified by a non-linear device such as a high power amplifier (HPF).

An OFDM-based communication system has such a problem, and therefore various studies have been conducted to improve such a characteristic of the PAPR. However, a method that has been suggested for improving the PAPR characteristic partially uses subcarriers, thereby reducing data transmission speed.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide an OFDM symbol generating apparatus, an OFDM symbol transmitting apparatus, an OFDM symbol receiving apparatus, and an OFDM symbol demodulating apparatus, each having an advantage of improving a characteristic of a PAPR without reducing data transmission speed according to insertion of additional information.

Technical Solution

An exemplary apparatus according to one exemplary embodiment of the present invention generates an orthogonal frequency division multiplexing (OFDM) symbol. The apparatus includes a plurality of weight applying units, a plurality of inverse fast Fourier transform (IFFT) operators, and a signal selector. The plurality of weight applying units respectively correspond to a plurality of weights, and generate a weight-applied symbol group by applying a corresponding weight to each symbol of a digital modulation symbol group. The plurality of IFFT operators respectively correspond to the plurality of weight applying units, and generate an IFFT symbol group by performing an IFFT operation on a weight-applied symbol group generated by a corresponding weight applying unit. The signal selector selects an IFFT symbol group having the minimum PAPR among a plurality of IFFT symbol groups generated by the plurality of IFFT operators. The plurality of weights respectively correspond to a plurality of phase weights, and a portion or all of the plurality of weight applying units divide the digital modulation symbol group into a first sub-group and a second sub-group and applies the phase weight either to the first sub-group or to the second group.

An exemplary apparatus according to another embodiment of the present invention receives an OFDM symbol and outputs a data symbol. The apparatus includes a digital converter, an FFT operator, a signal recovery unit, and a digital demodulator. The digital converter outputs a digital symbol group by converting the OFDM symbol into a digital signal. The FFT operator outputs a FFT symbol group by performing an FFT operation on the digital symbol group. The signal recovery unit estimates a weight applied to the FFT symbol group, compensates the estimated weight, and outputs a weight compensation symbol group. The digital demodulator demodulates the weight-compensated data symbol and outputs the demodulated data symbol. The weight corresponds to a phase weight, and the signal recovery unit estimates the phase weight applied to the FFT symbol group and compensates the estimated phase weight.

A method according to another embodiment of the present invention generates an OFDM symbol. The method includes: generating a plurality of weight-applied symbol groups respectively corresponding to a plurality of weights by applying the plurality of weights to a plurality of digital modulation symbol groups; generating a plurality of IFFT symbol groups, respectively corresponding to the plurality of weight-applied groups by performing IFFT on the plurality of weight-applied symbol groups; and selecting an IFFT symbol group having the minimum PAPR among the plurality of IFFT symbol groups and outputting the selected IFFT symbol group.

An exemplary method according to another embodiment of the present invention receives an OFDM symbol and outputs a data symbol. The method includes: converting the OFDM symbol into a digital signal and outputting a digital symbol group; transforming the digital symbol group by performing an FFT operation and outputting an FFT symbol group; estimating a weight applied to the FFT symbol group, compensating the weight, and outputting a weight compensation symbol group; and demodulating the weight compensation symbol group and outputting the data symbol.

Advantageous Effects

The OFDM symbol generating and transmitting apparatus according to the present invention can generate an OFDM symbol by applying a weight to a digital symbol, thereby improving a peak-to-average power ratio.

DESCRIPTION OF DRAWINGS

FIG. 2 is a block diagram of an OFDM-based signal transmitting apparatus according to a first exemplary embodiment of the present invention.

FIG. 3 is a block diagram of an OFDM-based signal transmitting apparatus according to a second exemplary embodiment of the present invention.

FIG. 4 is a block diagram of an OFDM-based signal transmitting apparatus according to a third exemplary embodiment of the present invention.

FIG. 5 is a block diagram of an OFDM-based signal transmitting apparatus according to a fourth exemplary embodiment of the present invention.

FIG. 6 is a block diagram of an OFDM-based signal transmitting apparatus according to a fifth exemplary embodiment of the present invention.

FIG. 7 is a block diagram of an OFDM-based signal receiving apparatus according to an exemplary embodiment of the present invention.

FIG. 8 is a signal constellation showing a phase distribution pattern according to the exemplary embodiment of the present invention.

FIG. 9 is a signal constellation showing a phase distribution pattern according to another exemplary embodiment of the present invention.

BEST MODE

Figure 1:
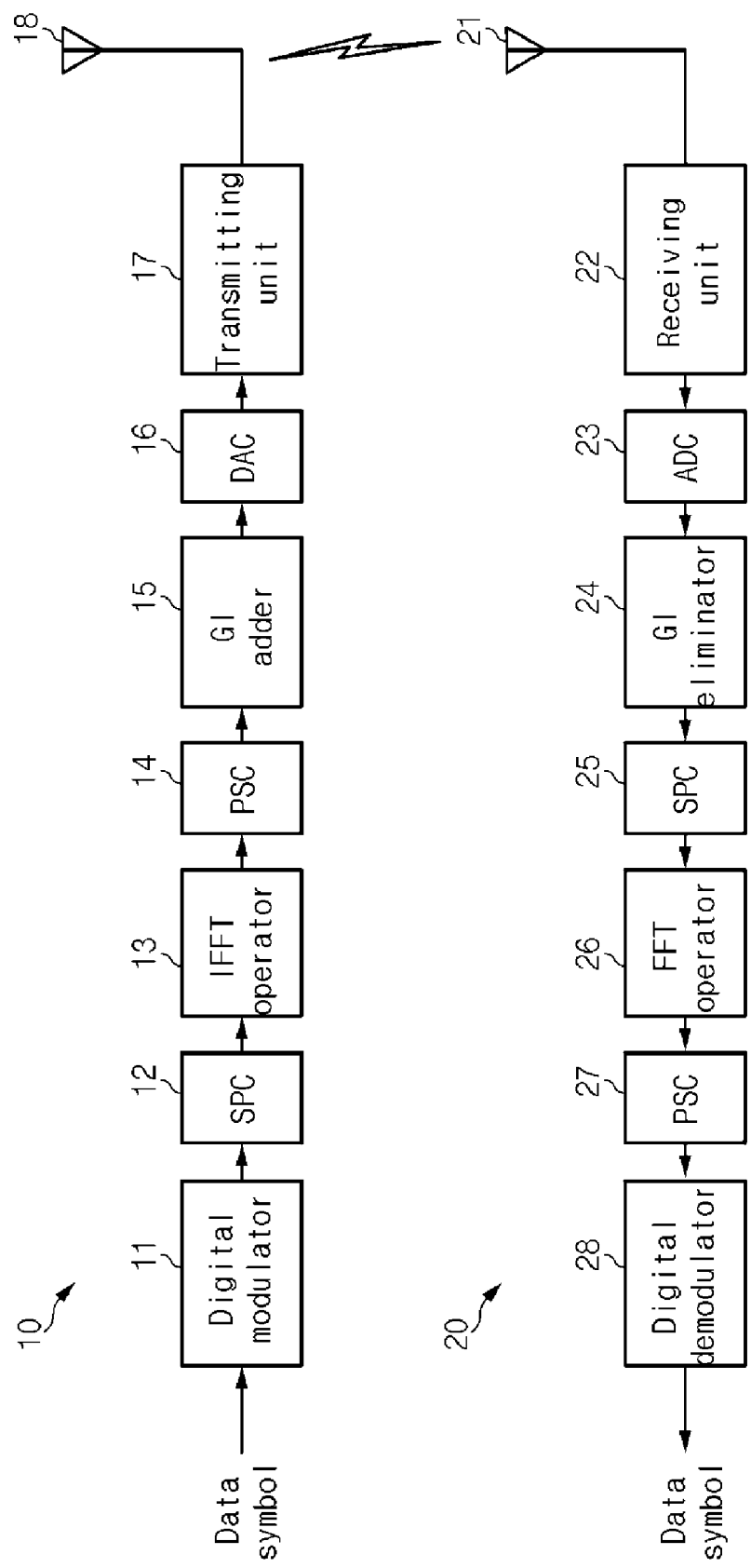
FIG. 1 is a block diagram of a conventional orthogonal frequency division multiplexing (OFDM)-based signal receiving apparatus.

Exemplary embodiments of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

An orthogonal frequency division multiplexing (OFDM) communication system and a method thereof will now be described in more detail with reference to the accompanying drawings.

An OFDM-based signal transmitting apparatus 100 according to a first exemplary embodiment of the present invention will be described with reference to FIG. 2.

FIG. 2 is a block diagram of the OFDM-based signal transmitting apparatus 100 according to the first exemplary embodiment of the present invention.

As shown in FIG. 2, the OFDM-based signal transmitting apparatus 100 according to the first exemplary embodiment of the present invention includes a digital modulator 101, a serial-to-parallel converter (SPC) 103, k weight applying units 105, k discrete Fourier transform (DFT) operators 107, k subcarrier allocators 111, k inverse fast Fourier transform (IFFT) operators 113, k parallel-to-serial converters (PSCs) 115, a signal selector 117, a guard interval (GI) adder 119, a windowing controller 121, a digital-to-analog converter (DAC) 123, a transmission unit 125, and a transmit antenna 127.

The k weight applying units 105 respectively correspond to k weights, and the k DFT operators 107 respectively correspond to the k weight applying units 105. In this case, the k subcarrier allocators 111 respectively correspond to the k DFT operators 107. In addition, the k IFFT operators 113 respectively correspond to the k subcarrier allocators 111, and the k PSCs 115 respectively correspond to the k IFFT operators 113.

The digital modulator 101 digitally modulates data (i.e., binary data) symbols to transmit the data symbols to a channel. The digital modulation method includes BPSK modulation, QPSK modulation, QAM, 16-QAM, and 64-QAM.

The SPC 103 serially receives M digital modulation symbols from the digital modulator 101 and outputs them in parallel. In this case, the M complex symbols output in parallel from the SPC 103 will be referred to as a digital modulation symbol group.

The weight applying unit 105 receives the digital modulation symbol group from the SPC 103, applies a weight to each of the complex symbols in the digital modulation symbol group, and outputs a weight-applied symbol group.

In the following, a process for receiving the digital modulation symbol group and outputting a weight-applied symbol group of the i-th weight applying unit 105 among the k weight applying units 105 will be described (where 1<i<k).

The i-th weight applying unit 105 receives M digital modulation symbols from the SPC 103, applies a weight i to each of the M digital modulation symbols, and outputs M weight-applied symbols. Herein, the M weight-applied symbols will be referred to as a weight-applied symbol group. In this case, the weight-applying unit applies a weight to a phase of each symbol by multiplying a phase vector to each of the M digital modulation symbols so that the weight applying unit can output M weight-applied symbols. Herein, the phase vector has a phase of $\pi*U/V$ (U and V are integers), and is formed of M elements each having the size of 1. The M elements of the phase vector respectively have the same phase value. In addition, the weight applying unit 105 may divide the digital modulation symbol group into L sub-groups and generate a phase weight symbol group by multiplying a different phase vector to each of the sub-groups.

The DFT operator 107 receives the M weight-applied symbols from the weight applying unit 105, performs a DFT operation on the M weight-applied symbols, and outputs M DFT symbols. In this case, the M DFT symbols output from the DFT operator 107 will be referred to as a DFT symbol group.

The subcarrier allocator 111 receives M DFT symbols from the DFT operator 107 and outputs N subcarrier allocation symbols. In this case, the subcarrier allocator 111 adds N to M of 0s to the DFT symbol group, allocates the 0-added N DFT symbols to each subcarrier, and outputs N subcarrier allocation symbols. Herein, the N subcarrier allocation symbols output from the subcarrier allocator 111 will be referred to as a subcarrier allocation symbol group.

The IFFT operator 113 receives the N subcarrier allocation symbols from the subcarrier allocator 111, performs an IFFT operation, and outputs N IFFT symbols. Herein, the N IFFT symbols output from the IFFT operator 113 will be referred to as an IFFT symbol group.

The PSC 115 serially receives the N IFFT symbols from the IFFT operator 113 and outputs them in parallel.

The signal selector 117 estimates a peak-to-average power ratio (PAPR) of each IFFT symbol group by receiving k IFFT symbol groups from the PSC 115, and outputs an IFFT symbol group having the lowest PAPR.

The GI adder 119 adds a guard interval (i.e. a cyclic prefix) to each of the IFFT symbol groups output from the signal selector 117 and generates a guard interval (GI)-added symbol group. In this case, the cyclic prefix is a portion of a plurality of IFFT symbols of each of the IFFT symbol groups. The symbol group output from the GI adder 119 will be referred to as a GI-added symbol group.

The windowing controller 121 receives the GI-added symbol group, filters the GI-added symbol group, and outputs a windowing symbol group in which an intersymbol interference is reduced. In this case, the windowing controller 121 eliminates a high frequency component from the GI-added symbol group in the time domain so as to prevent a steep phase change from occurring between symbols of the GI-added symbol group.

The DAC 123 receives the windowing symbol group from the windowing controller 121, converts the windowing symbol group into an analog signal, and generates an OFDM symbol.

The transmission unit 125 amplifies the OFDM symbol generated by the DAC 123 to a RF signal and transmits the RF signal to the channel.

An OFDM-based signal transmitting apparatus according to a second exemplary embodiment of the present invention will be described with reference to FIG. 3.

FIG. 3 is a block diagram of an OFDM-based signal transmitting apparatus 200 according to the second exemplary embodiment of the present invention.

As shown in FIG. 3, the OFDM-based signal transmitting apparatus 200 according to the second exemplary embodiment of the present invention includes a QPSK modulator 201, an SPC 203, three weight applying units 205a, 205b, and 205c, three DFT operators 207, three subcarrier allocators 211, three IFFT operators 213, three PSCs 215, a signal selector 217, a GI adder 219, a windowing controller 221, a DAC 223, a transmission unit 225, and a transmit antenna 227.

The QPSK modulator 201 transmits 2 bits, which are a combination of digital symbols 0 and 1, corresponding to 4 phases of a carrier. In this case, the carrier has a phase interval of $\pi/2$.

In this case, the SPC 203, the DFT operator 207, the subcarrier allocator 211, the IFFT operator 213, the PSC 215, the signal selector 217, the GI adder 219, the windowing controller 221, the DAC 223, the transmission unit 225, and the transmit antenna 227 are similar to those of the OFDM-based signal transmitting apparatus 100 of the first exemplary embodiment of the present invention of FIG. 2, and therefore further descriptions will be omitted.

The weight applying units 205a, 205b, and 205c of the OFDM-based signal transmitting apparatus according to the second exemplary embodiment of the present invention will be described in further detail.

The weight applying unit 205a receives M digital modulation symbols from the SPC 203, applies a weight to a phase of each symbol of the M digital modulation symbols by multiplying a phase vector to each of the M digital modulation symbols, and outputs M weight-applied symbols. Herein, the M weight-applied symbols will be referred to as a first weight-applied symbol group. In this case, the phase vector has a phase of 0 and is formed of M elements, each having the size of 1, and the same phase vector is multiplied to each symbol of the digital modulation symbol group. In addition, a constituent element of the phase vector may have a phase of *U/V (where U and V are integers) rather than 0. The symbols of the first weight-applied symbol group may have a phase distribution pattern corresponding to or similar to 1. (a) of FIG. 8.

The weight applying unit 205b receives the M digital modulation symbols from the SPC 203, applies a weight to an odd-numbered symbol of the M digital modulation symbols by multiplying a phase vector to each of the M digital modulation symbols, and outputs M weight-applied symbols. Herein, the M weight-applied symbols output from the weight applying unit 205b will be referred to as a second weight-applied symbol group. In this case, the phase vector is formed of M elements, each having the size of 1, and an odd-numbered element of the phase vector has a phase of $\pi/4$ and an even-numbered element of the phase vector has a phase of 0. In addition, an odd-numbered symbol of the second weight-applied symbol group may have a phase distribution pattern corresponding to, or similar to, (b) of FIG. 8, and an even-numbered symbol of the second weight-applied symbol group may have a phase distribution pattern corresponding to, or similar to, (a) of FIG. 1.

The weight applying unit 205c receives the M digital modulation symbols from the SPC 203, applies a weight to an even-numbered symbol of the M digital modulation symbols by multiplying a phase vector to each of the M digital modulation symbols, and outputs M weight-applied symbols. Herein, the M weight-applied symbols output from the weight applying unit 205c will be referred to as a third weight-applied symbol group. In this case, the phase vector is formed of M elements, each having the size of 1, and an even-numbered element has a phase of 0 and an odd numbered element has a phase of π/4. In addition, even-numbered symbols of the third weight-applied symbol group may have a phase distribution pattern corresponding to, or similar to, (a) of FIG. 8, and odd-numbered symbols of the third weight-applied symbol group may have a phase distribution pattern corresponding to, or similar to, (b) of FIG. 8.

An OFDM-based signal transmitting apparatus 300 according to a third exemplary embodiment of the present invention will be described with reference to FIG. 4.

FIG. 4 is a block diagram of an OFDM-based signal transmitting apparatus 300 according to a third exemplary embodiment of the present invention.

As shown in FIG. 4, the OFDM-based signal transmitting apparatus 300 according to the third exemplary embodiment of the present invention includes a QPSK modulator 301, a SPC 303, two weight applying units 305a and 305b, two DFT operators 307, two subcarrier allocators 311, two IFFT operators 313, two PSCs 315, a signal selector 317, a GI adder 319, a windowing controller 321, a DAC 323, a transmission unit 325, and a transmit antenna 327.

The QPSK modulator 201 transmits 2 bits, which are a combination of data symbols 0 and 1, corresponding to 4 phases of a subcarrier. In this case, the carrier has a phase interval of π/2.

The SPC 303, the DFT operator 307, the subcarrier allocator 311, the IFFT operator 313, the PSC 315, the signal selector 317, the GI adder 319, the windowing controller 321, the DAC 323, the transmission unit 325, and the transmit antenna 327 are similar to those of the OFDM-based signal transmitting apparatus 100 of the first exemplary embodiment of the present invention of FIG. 2, and therefore detailed descriptions will be omitted.

Weight applying units 305a and 305b of the OFDM-based signal transmitting apparatus according to the third exemplary embodiment of the present invention will be described in more detail.

The weight applying unit 305a receives M digital modulation symbols from the SPC 303, applies a weight to a phase of each symbol of the M digital modulation symbols by multiplying a phase vector to each of the M digital modulation symbols, and outputs M weight-applied symbols. Herein, the M weight-applied symbols output from the weight applying unit 305a will be referred to as a fourth weight-applied symbol group. In this case, the phase vector is formed of M elements, each having the size of 1, and the same phase vector is applied to each symbol of the digital modulation symbol group. Herein, a constituent element of the phase vector may have a phase of *U/V (where U and V are integers) rather than 0. In addition, symbols of the fourth weight-applied symbol groups may have a phase distribution pattern corresponding to, or similar to, (a) of FIG. 8.

The weight applying unit 305b receives M digital modulation symbols from the SPC 303, applies a weight to an odd-numbered symbol of the M digital modulation symbols by multiplying a phase vector to each of the M digital modulation symbols, and outputs M weight-applied symbols. Herein, the M weight-applied symbols output from the weight applying unit 305b will be referred to as a fifth weight-applied symbol group. In this case, the phase vector is formed of M elements, each having the size of 1, and an odd-numbered element has a phase of π/4 and an even-numbered element has a phase of 0. In addition, the weight applying unit 305b may apply a weight not to the odd-numbered symbol but to the even-numbered symbol. In this case, the phase vector is formed of M elements, each having the size of 1, and an odd-numbered element has a phase of 0 and an even-numbered element has a phase of π/4.

In addition, weight-applied symbols among the fifth weight-applied symbol groups may have a phase distribution pattern corresponding to, or similar to, (b) of FIG. 8, and symbols to which weights are not applied may have a phase distribution pattern corresponding to, or similar to, (a) of FIG. 8.

An OFDM-based signal transmitting apparatus 400 according to a fourth exemplary embodiment of the present invention will be described with reference to FIG. 5.

FIG. 5 is a block diagram of an OFDM-based signal transmitting apparatus according to the fourth exemplary embodiment of the present invention.

As shown in FIG. 5, the OFDM-based signal transmitting apparatus 400 according to the fourth exemplary embodiment of the present invention includes a BPSK modulator 401, an SPC 403, three weight applying units 405a, 405b, and 405c, three DFT operator 407, three subcarrier allocators 411, three IFFT operators 413, three PSCs 415, a signal selector 417, a GI adder 419, a windowing controller 421, a DAC 423, a transmission unit 425, and a transmit antenna 427.

The BPSK modulator 401 transmits a value of a data symbol (i.e., 0 or 1) corresponding to phases of 0 and π of a carrier.

The SPC 403, the DFT operator 407, the subcarrier allocator 411, the IFFT operator 413, the PSC 415, the signal selector 417, the GI adder 419, the windowing controller 421, the DAC 423, the transmission unit 425, and the transmit antenna 427 are similar to those of the OFDM-based signal transmitting apparatus of the first exemplary embodiment of the present invention of FIG. 2, and therefore detailed descriptions will be omitted.

The weight applying units 405a, 405b, and 405c of the OFDM-based signal transmitting apparatus according to the fourth exemplary embodiment of the present invention will be described in further detail.

The weight applying unit 405a receives M digital modulation symbols from SPC 403, applies a weight to a phase of each symbol of the M digital modulation symbols by multiplying a phase vector to each of the M digital modulation symbols, and output M weight-applied symbols. Herein, the M weight-applied symbols output from the weight applying unit 405a will be referred to as a sixth weight-applied symbol group. In this case, the phase vector is formed of M elements, each having the size of 1, and the same phase vector is multiplied to the respective symbols of the digital modulation symbol group. Herein, a constituent element of the phase vector may have a phase of *U/V (where U and V are integers) rather than 0. In addition, symbols of the fourth weight-applied symbol groups may have a phase distribution pattern corresponding to, or similar to, (a) of FIG. 9.

The weight applying unit 405b receives M digital modulation symbols from the SPC 403, applies a weight to an odd-numbered symbol of the M digital modulation symbols by multiplying a phase vector to each of the M digital modulation symbols, and outputs M weight-applied symbols.

Herein, the M digital modulation symbols output from the weight applying unit 205b will be referred to as a seventh weight-applied symbol group. In this case, the phase vector is formed of M elements, each having the size of 1, and an even-numbered element has a phase of 0 and an odd-numbered element has a phase of $\pi/2$.

In addition, odd-numbered symbols of the seventh weight-applied symbol group may have a phase distribution pattern corresponding to, or similar to, (b) of FIG. 9, and odd-numbered symbols of the seventh weight-applied symbol group may have a phase distribution pattern corresponding to, or similar to, (a) of FIG. 9.

The weight applying unit 405c receives M digital modulation symbols from the SPC 403, applies a weight to an even-numbered symbol of the M digital modulation symbols by multiplying a phase vector to each of the M digital modulation symbols, and outputs M weight-applied symbols. Herein, the M weight-applied symbols output from the weight applying unit 405c will be referred to as an eighth weight-applied symbol group. In this case, the phase vector is formed of M elements, each having the size of 1, and an odd-numbered element has a phase of 0 and an even-numbered element has a phase of $\pi/2$. In addition, odd-numbered symbols of the eighth weight-applied symbol group may have a phase distribution pattern corresponding to, or similar to, (a) of FIG. 9, and odd-numbered symbols of the eighth weight-applied symbol group may have a phase distribution pattern corresponding to, or similar to, (b) of FIG. 9.

An OFDM-based signal transmitting apparatus 500 according to a fifth exemplary embodiment of the present invention will be described with reference to FIG. 6.

FIG. 6 is a block diagram of an OFDM-based signal transmitting apparatus according to the fifth exemplary embodiment of the present invention.

As shown in FIG. 6, the OFDM-based signal transmitting apparatus 500 includes a BPSK modulator 501, a SPC 503, two weight applying units 505a and 505b, two DFT operators 507, two subcarrier allocators 511, two IFFT operators 513, two PSCs 515, a signal selector 517, a GI adder 519, a windowing controller 521, a DAC 523, a transmission unit 525, and a transmit antenna 527.

The BPSK modulator 501 transmits a value of a data symbol (i.e., 0 or 1) corresponding to phases of 0 and $\pi$ of a carrier.

In this case, the SPC 503, the DFT operator 507, the subcarrier allocator 511, the IFFT operator 513, the PSC 515, the signal selector 517, the GI adder 519, the windowing controller 521, the DAC 523, the transmission unit 525, and the transmit antenna 527 are similar to those of the OFDM-based signal transmitting apparatus 100 of the first exemplary embodiment of the present invention of FIG. 2, and therefore detailed descriptions will be omitted.

The weight applying units 505a and 505b of the OFDM-based signal transmitting apparatus according to the fifth exemplary embodiment of the present invention will be described in further detail.

The weight applying unit 505a receives M digital modulation symbols from the SPC 503, applies a weight to a phase of each of the M digital modulation symbols by multiplying a phase vector to each of the M modulation symbols, and outputs M weight-applied symbols. Herein, the M weight-applied symbols output from the weight applying unit 505a will be referred to as a ninth weight-applied symbol group. In this case, the phase vector has a phase of 0 and is formed of M elements, each having the size of 1, and the same phase vector is multiplied to each symbol of the digital modulation symbol group. In addition, a constituent element of the phase vector may have a phase of *U/V (where U and V are integers) rather than 0. The symbols of the ninth weight-applied symbol group may have a phase distribution pattern corresponding to or similar to (a) of FIG. 9.

The weight applying unit 505b receives M digital modulation symbols from the SPC 503, applies a weight to an odd-numbered symbol of the M digital modulation symbols by multiplying a phase vector to each of the M digital modulation symbols, and outputs M weight-applied symbols. Herein, the M weight-applied symbols output from the weight applying unit 505b will be referred to as a tenth weight-applied symbol group. In this case, the phase vector has a phase of 0 and is formed of M elements, each having the size of 1, and an odd-numbered element has a phase of $\pi/2$ and an even-numbered element has a phase of 0.

In addition, the weight applying unit 505b may apply a weight not to the odd-numbered symbol but to the even-numbered symbol. In this case, the phase vector is formed of M elements, each having the size of 1, and an odd-numbered element has a phase of 0 and an even-numbered element has a phase of $\pi/2$. In addition, weight-applied symbols among the tenth weight-applied symbol groups may have a phase distribution pattern corresponding to, or similar to, (b) of FIG. 9, and symbols to which weights are not applied may have a phase distribution pattern corresponding to, or similar to, (a) of FIG. 9.

An OFDM-based signal receiving apparatus 600 according to the exemplary embodiment of the present invention will be described with reference to FIG. 7.

FIG. 7 is a block diagram of an OFDM-based signal receiving apparatus 600 according to the exemplary embodiment of the present invention.

As shown in FIG. 7, the OFDM-based signal receiving apparatus 600 includes a receive antenna 601, a receiving unit 603, an ADC 605, a GI eliminator 607, an SPC 609, a FFT operator 611, a subcarrier deallocator 613, a channel estimator 615, a inverse discrete Fourier transform (IDFT) operator 617, a signal recovery unit 619, a PSC 621, and a digital demodulator 623.

The receiving unit 603 receives an RF signal from the OFDM-based signal transmitting apparatus 100 through the receive antenna 601 and outputs an OFDM symbol.

The ADC 605 receives the OFDM signal which is an analog signal, converts the OFDM signal into a digital signal, and generates (N+a) digital symbols. Herein, symbols among the (N+a) digital symbols correspond to a GI. The (N+a) digital symbols generated by the ADC 605 will be referred to as a digital symbol group.

The GI eliminator 607 eliminates the symbols that correspond to the GI from the digital symbol group output from the ADC 605 and outputs N GI-eliminated symbols. The N GI-eliminated symbols output from the GI eliminator 607 will be referred to as a GI-eliminated symbol group.

The SPC 609 serially receives the GI-eliminated group from the GI eliminator 607 and outputs the GI-eliminated group in parallel.

The FFT operator 611 performs an FFT operation on the GI-eliminated symbol group output in parallel from the SPC 609 and generates N FFT symbols. The N FFT symbols generated by the FFT operator 611 will be referred to as an FFT symbol group.

The subcarrier deallocator 613 deallocates the FFT symbol group corresponding to the subcarrier allocator 111 of the signal transmitting apparatus 100, eliminates 0 from the deallocated FFT symbol group, and outputs the subcarrier deallocation symbol group.

The channel estimator 615 receives the subcarrier deallocation symbol group from the subcarrier deallocator 613, and outputs a channel estimation symbol group after compensating signal distortion due to the channel. In this case, the channel estimator 615 can be provided as an equalizer.

The IDFT operator 617 receives the channel estimation symbol group from the channel estimator 615, performs an IDFT operation, and outputs M IDFT symbols. The M IDFT symbols output from the IDFT operator 617 will be referred to as an IDFT symbol group.

The signal recovery unit 619 receives the IDFT symbol group from the IDFT operator 617, estimates a phase vector used for phase weighting of each of the M IDFT symbols, compensates phase transmission of each symbol, and outputs M weight compensation symbol columns. The M weight compensation symbol columns output from the signal recovery unit 619 will be referred to as a weight compensation symbol group.

For example, when odd-numbered symbols of the IDFT symbol group input to the signal recovery unit 619 have a phase distribution pattern corresponding to, or similar to, (a) of FIG. 8 and even-numbered symbols of the IDFT symbol groups input to the signal recovery unit 619 have a phase distribution pattern corresponding to, or similar to, (b) of FIG. 8, the signal recovery unit 619 estimates that a phase vector used for the phase weighting is formed of M elements, each having the size of 1, and an odd-numbered element of the phase vector has a phase of 0 and an even-numbered element of the phase vector has a phase of $\pi/4$. That is, the signal recovery unit 619 estimates that the IDFT symbol group is phase-weighted by the weight applying unit 205c. Subsequently, the signal recovery unit 619 compensates the IDFT symbol group through the estimated phase vector. That is, the signal recovery unit 619 outputs a weight compensation symbol group formed by compensating even-numbered symbols of the IDFT symbol group by $2n\pi$ output from the signal recovery unit 619 in parallel.

The digital demodulator 623 digitally demodulates the weight compensation symbol group serially output from the PSC 621 and generates a data signal which is binary data.

The above-described exemplary embodiments of the present invention can be realized not only through a method and an apparatus, but also through a program that can perform functions corresponding to configurations of the exemplary embodiments of the present invention or a recording medium storing the program, and this can be easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An apparatus for generating an orthogonal frequency division multiplexing (OFDM) symbol, the apparatus comprising:
    a plurality of phase weight applying units respectively corresponding to a plurality of phase weights that respectively correspond to a plurality of phase vectors, and generating a weight-applied symbol group by multiplying a corresponding phase vector to each symbol of a digital modulation symbol group;
    a plurality of inverse fast Fourier transform (IFFT) operators respectively corresponding to the plurality of phase weight applying units, and generating an IFFT symbol group by performing an IFFT operation on the weight-applied symbol group generated by a corresponding weight applying unit; and
    a signal selector for selecting an IFFT symbol group having a minimum peak-to-average power ratio (PAPR) among a plurality of IFFT symbol groups generated by the plurality of IFFT operators.

2. The apparatus of claim 1, wherein a portion or all of the plurality of weight applying units divide the digital modulation symbol group into a first sub-group and a second sub-group, and apply the phase weight to one of the first sub-group and the second sub-group.

3. The apparatus of claim 2, further comprising a digital modulator for generating the digital modulation symbol group by performing quadrature phase shift modulation (QAM) on a plurality of data symbols,
    wherein the plurality of weight applying units comprise:
    a first weight applying unit for applying a phase weight of 0 to the digital modulation symbol group; and
    a second weight applying unit for applying a phase weight of $\pi/4$ to the first sub-group and applying the phase weight of 0 to the second sub-group.

4. The apparatus of claim 3, wherein the plurality of weight applying units further comprise a third weight applying unit for applying a phase weight of 0 to the first sub-group and applying a phase weight of $\pi/4$ to the second sub-group.

5. The apparatus of claim 2, further comprising a digital modulator for generating the digital modulation symbol group by performing binary phase shift keying (BPSK) modulation on a plurality of data symbols,
    wherein the plurality of weight applying units comprise:
    a first weight applying unit for applying a phase weight of 0 to the digital modulation symbol group; and
    a second weight applying unit for applying a phase weight of $\pi/2$ to the first sub-group and applying a phase weight of 0 to the second sub-group.

6. The apparatus of claim 5, wherein the plurality of weight applying units further comprise a third weight applying unit for applying a phase weight of 0 to the first sub-group and applying a phase weight of $\pi/2$ to the second sub-group.

7. The apparatus of claim 3, wherein the first sub-group includes odd symbols of the digital modulation symbol group, and the second sub-group includes even symbols of the digital modulation symbol group.

8. The apparatus of claim 1, wherein the apparatus comprises:
    a plurality of fast Fourier transform (FFT) operators respectively corresponding to the plurality of weight applying units, and performing an FFT operation on a weight-applied symbol group generated by a corresponding weight applying unit so as to generate an FFT symbol group;
    a plurality of subcarrier allocators respectively corresponding to the plurality of FFT operators, and allocating a plurality of subcarriers to the FFT symbol group generated by a corresponding FFT operator so as to generate a subcarrier allocation symbol group; and
    a plurality of inverse fast Fourier transform (IFFT) operators respectively corresponding to the plurality of subcarrier allocators, performing IFFT on a subcarrier allocation symbol group generated by a corresponding subcarrier allocator so as to generate an IFFT symbol group.

9. The apparatus of claim 8, further comprising:
    a guard interval adder for adding a guard interval to an IFFT symbol group output from the signal selector so as to generate a guard interval-added symbol group;

a windowing controller for eliminating a radio frequency component from the guard interval-added symbol group so as to generate a windowing symbol group; and a transmission unit for converting the windowing symbol group into an analog signal so as to generate an orthogonal division multiplexing (OFDM) symbol, amplifying the OFDM symbol, and transmitting the amplified OFDM symbol to a channel.

10. An apparatus for receiving an orthogonal frequency division multiplexing (OFDM) symbol and outputting a data symbol, the apparatus comprising:

a digital converter for outputting a digital symbol group by converting the OFDM symbol into a digital signal;

a fast Fourier transform (FFT) operator for outputting an FFT symbol group by performing an FFT operation on the digital symbol group;

a signal recovery unit for estimating a phase weight applied to the FFT symbol group wherein the phase weight corresponds to a phase vector and the corresponding phase vector is multiplied to a phase of each symbol of the digital symbol group, and for compensating the estimated weight, and outputting a weight compensation symbol group; and a digital demodulator for demodulating the weight compensation symbol group and outputting the demodulated data symbol.

11. The apparatus of claim 10, wherein the signal recovery unit estimates the phase weight applied to the FFT symbol group and compensates the estimated phase weight.

12. The apparatus of claim 11, wherein the signal recovery unit estimates the phase weight based on a first sub-group and a second sub-group included in the FFT symbol group and compensates the estimated phase weight.

13. The apparatus of claim 12, wherein the signal recovery unit estimates the phase weight based on a phase distribution pattern difference between the first sub-group and the second sub-group and compensates the estimated phase weight.

14. The apparatus of claim 10, wherein the apparatus comprises:

a subcarrier deallocator for outputting a subcarrier deallocation symbol group by deallocating the FFT symbol group for each subcarrier;

a channel estimator for outputting a channel estimation symbol group by compensating distortion of the subcarrier deallocation symbol group;

an inverse fast Fourier transform (IFFT) operator for outputting an IFFT symbol group by performing an IFFT operation on the channel estimation symbol group; and a signal recovery unit for estimating a weight applied to the IFFT symbol group, compensating the weight, and outputting a weight compensation symbol group.

15. The apparatus of claim 14, further comprising:

a guard interval eliminator outputting a guard interval-eliminated symbol group by eliminating a guard interval from the digital symbol group; and an FFT operator for outputting an FFT symbol group by performing an FFT operation on the guard interval-eliminated symbol group.

16. A computer-implemented method for generating an orthogonal frequency division multiplexing (OFDM) symbol, the method comprising:

generating a plurality of weight-applied symbol groups respectively corresponding to a plurality of phase weights that respectively correspond to a plurality of phase vectors, by multiplying a corresponding phase vector to each symbol of a digital modulation symbol group;

generating a plurality of IFFT symbol groups, respectively corresponding to the plurality of weight-applied groups by performing inverse fast Fourier transform (IFFT) on the plurality of weight-applied symbol groups; and selecting an IFFT symbol group having a minimum peak-to-average power ratio (PAPR) among the plurality of IFFT symbol groups and outputting the selected IFFT symbol group.

17. The computer-implemented method of claim 16, wherein the generating of the plurality of weight-applied symbol groups comprises:

dividing the digital modulation symbol groups into a first sub-group and a second sub-group; and generating a portion or all of the plurality of weight-applied symbol groups by applying a phase weight to one of the first sub-group and the second sub-group.

18. The computer-implemented method of claim 16, wherein the method comprises:

generating a plurality of FFT symbol groups by performing FFT on the plurality of weight-applied symbol groups;

generating a plurality of subcarrier allocation symbol groups by allocating a plurality of subcarriers to the plurality of FFT symbol groups; and generating a plurality of IFFT symbol group by performing IFFT on the plurality of subcarrier allocation symbol groups.

19. The computer-implemented method of claim 18, further comprising:

generating a guard interval-added symbol group by adding a guard interval to the IFFT symbol group having the minimum PAPR;

generating a windowing symbol group by eliminating a radio frequency component from the guard interval-added symbol group; and converting the windowing symbol group into an analog signal, amplifying the windowing symbol group that has been converted into the analog signal, and transmitting the amplified the windowing symbol group to a channel.

20. A method for receiving an orthogonal frequency division multiplexing (OFDM) symbol and outputting a data symbol, the method comprising:

converting the OFDM symbol into a digital signal and outputting a digital symbol group;

transforming the digital symbol group by performing a fast Fourier transform (FFT) operation and outputting an FFT symbol group;

estimating a weight applied to the FFT symbol group wherein the weight corresponds to a phase vector and the corresponding phase vector is multiplied to each symbol of the digital symbol group, and compensating the weight, and outputting a weight compensation symbol group; and digitally demodulating the weight compensation symbol group and outputting the data symbol.

21. The method of claim 20, wherein the outputting of the weight compensation symbol group comprises estimating the phase weight applied to the FFT symbol group and compensating the estimated phase weight.

22. The method of claim 21, wherein the outputting of the weight compensation symbol group comprises:

estimating the phase weight based on a phase distribution pattern of a first sub-group and a phase distribution pattern of a second sub-group, the first sub-group and the second sub-group included in the FFT symbol group; and compensating the estimated phase weight.

23. The method of claim 20, wherein the method comprises:

deallocating the FFT symbol group for each subcarrier and outputting a subcarrier deallocation symbol group;

compensating distortion of the subcarrier deallocation symbol group and outputting a channel estimation symbol group;

performing an inverse FFT (IFFT) operation on the channel-estimated symbol group and outputting an IFFT symbol group; and estimating a weight applied to the IFFT symbol group, compensating the weight, and outputting a weight compensation symbol group.

24. The method of claim 23, further comprising:

eliminating a guard interval from the digital symbol group and outputting a guard interval-eliminated symbol group; and performing an FFT operation on the guard interval-eliminated symbol group and outputting an FFT symbol group.

* * * * *